United States Patent
Anderberg

(10) Patent No.: US 10,353,073 B1
(45) Date of Patent: Jul. 16, 2019

(54) POINT CLOUD COLORIZATION SYSTEM WITH REAL-TIME 3D VISUALIZATION

(71) Applicant: Nurulize, Inc., Los Angeles, CA (US)

(72) Inventor: Tobias Anderberg, Los Angeles, CA (US)

(73) Assignee: Nurulize, Inc., Los Angeles, CA (US)

( * ) Notice: Subject to any disclaimer, the term of this patent is extended or adjusted under 35 U.S.C. 154(b) by 0 days.

(21) Appl. No.: 16/246,178

(22) Filed: Jan. 11, 2019

(51) Int. Cl.
| | |
|---|---|
| *G06T 7/90* | (2017.01) |
| *G06T 5/20* | (2006.01) |
| *G01S 17/89* | (2006.01) |
| *G06T 11/00* | (2006.01) |
| *G06T 3/00* | (2006.01) |
| *G06T 17/05* | (2011.01) |

(52) U.S. Cl.
CPC ............ *G01S 17/89* (2013.01); *G06T 3/0006* (2013.01); *G06T 5/20* (2013.01); *G06T 7/90* (2017.01); *G06T 11/001* (2013.01); *G06T 17/05* (2013.01)

(58) Field of Classification Search
CPC ......... G01S 17/89; G06T 3/0006; G06T 5/20; G06T 17/05; G06T 11/001; G06T 7/90
See application file for complete search history.

(56) References Cited

U.S. PATENT DOCUMENTS

| | | | | |
|---|---|---|---|---|
| 7,817,823 B1* | 10/2010 | O'Donnell | ............... | G06T 15/60 345/426 |
| 2012/0038751 A1* | 2/2012 | Yuan | ................... | H04N 5/23232 348/51 |
| 2012/0327083 A1* | 12/2012 | Nishimura | ........... | G06F 3/04815 345/419 |
| 2017/0094262 A1* | 3/2017 | Peterson | .............. | H04N 21/854 |

* cited by examiner

*Primary Examiner* — Tapas Mazumder
(74) *Attorney, Agent, or Firm* — Arc IP Law, PC; Joseph J. Mayo

(57) ABSTRACT

System that enables colorization and color adjustments on 3D point clouds. Point clouds are projected onto a 2D view, for example with an equirectangular projection. A user may color regions on the 2D view, and preview the changes immediately in a 3D view of the point cloud without a time-consuming update of the point cloud data. Because any 2D projection introduces distortions, 3D preview is important for the user to observe the effects of the color changes on the point cloud. Embodiments may for example render the color of each point in the point cloud by testing whether the 2D projection of the point is inside the colored region. Alternatively, the region may be triangulated, and a GPU may render a texture image and use this texture to render the 3D view. Applications may include generation of a color 3D virtual reality environment using point clouds and color-adjusted imagery.

12 Claims, 15 Drawing Sheets
(12 of 15 Drawing Sheet(s) Filed in Color)

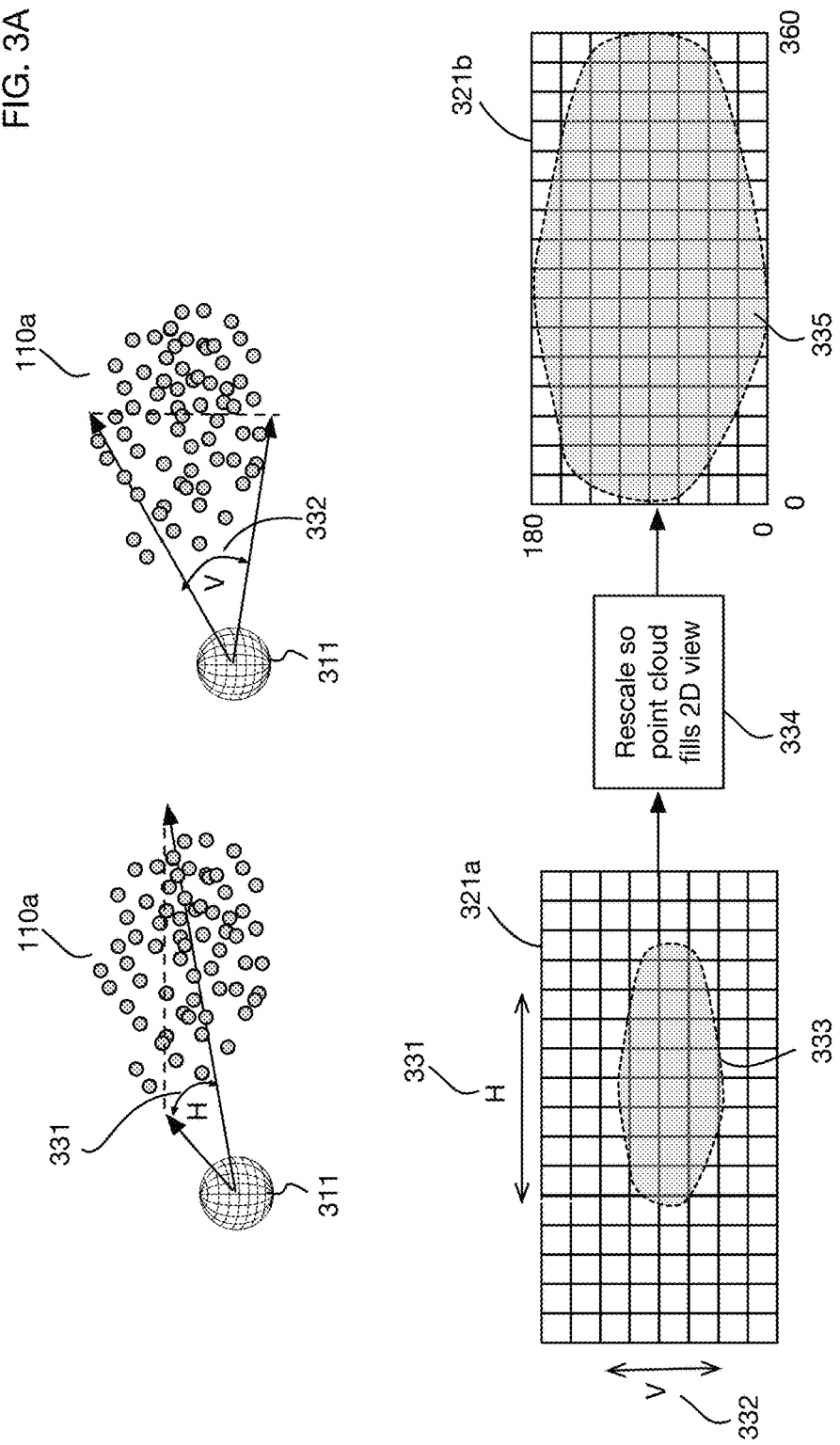

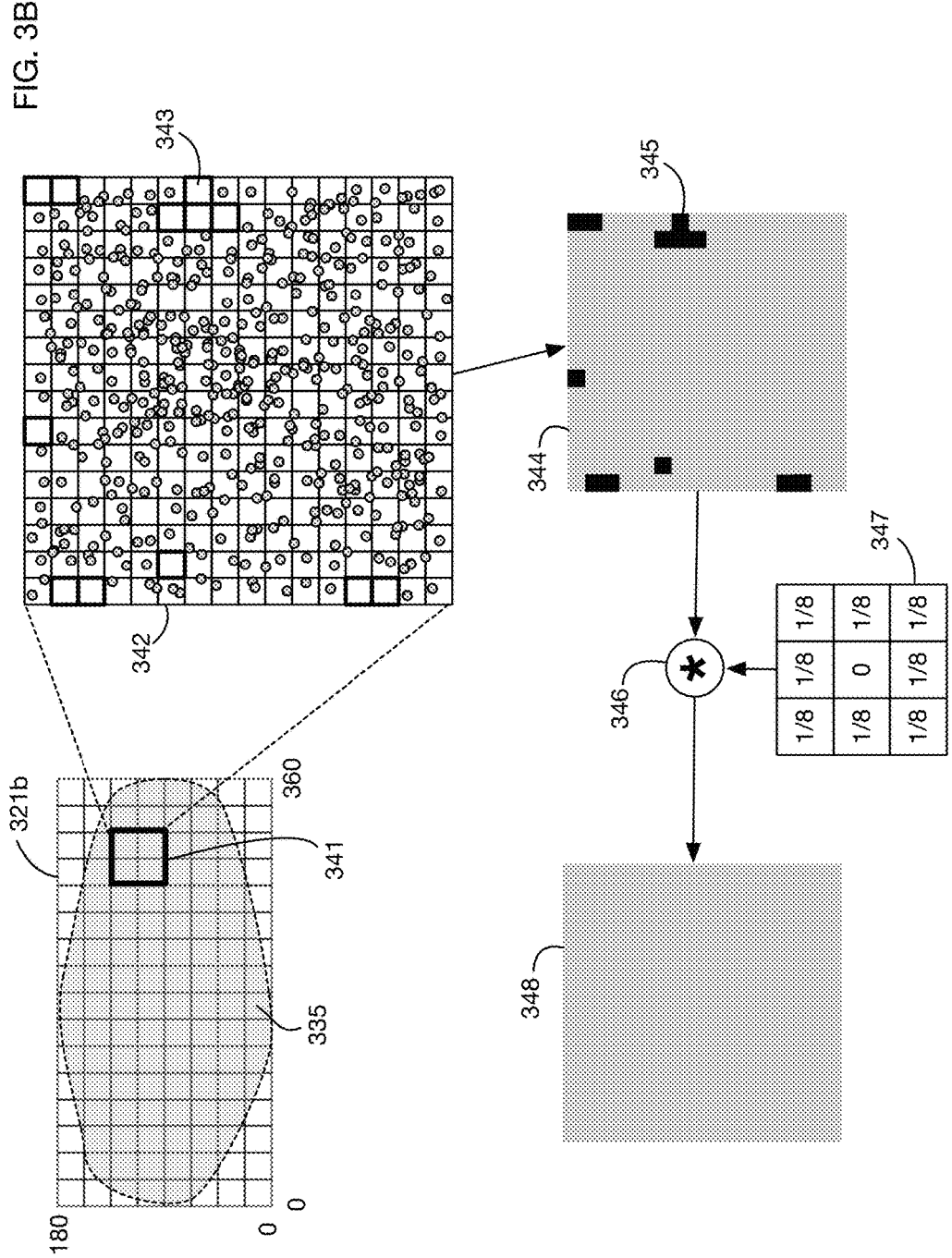

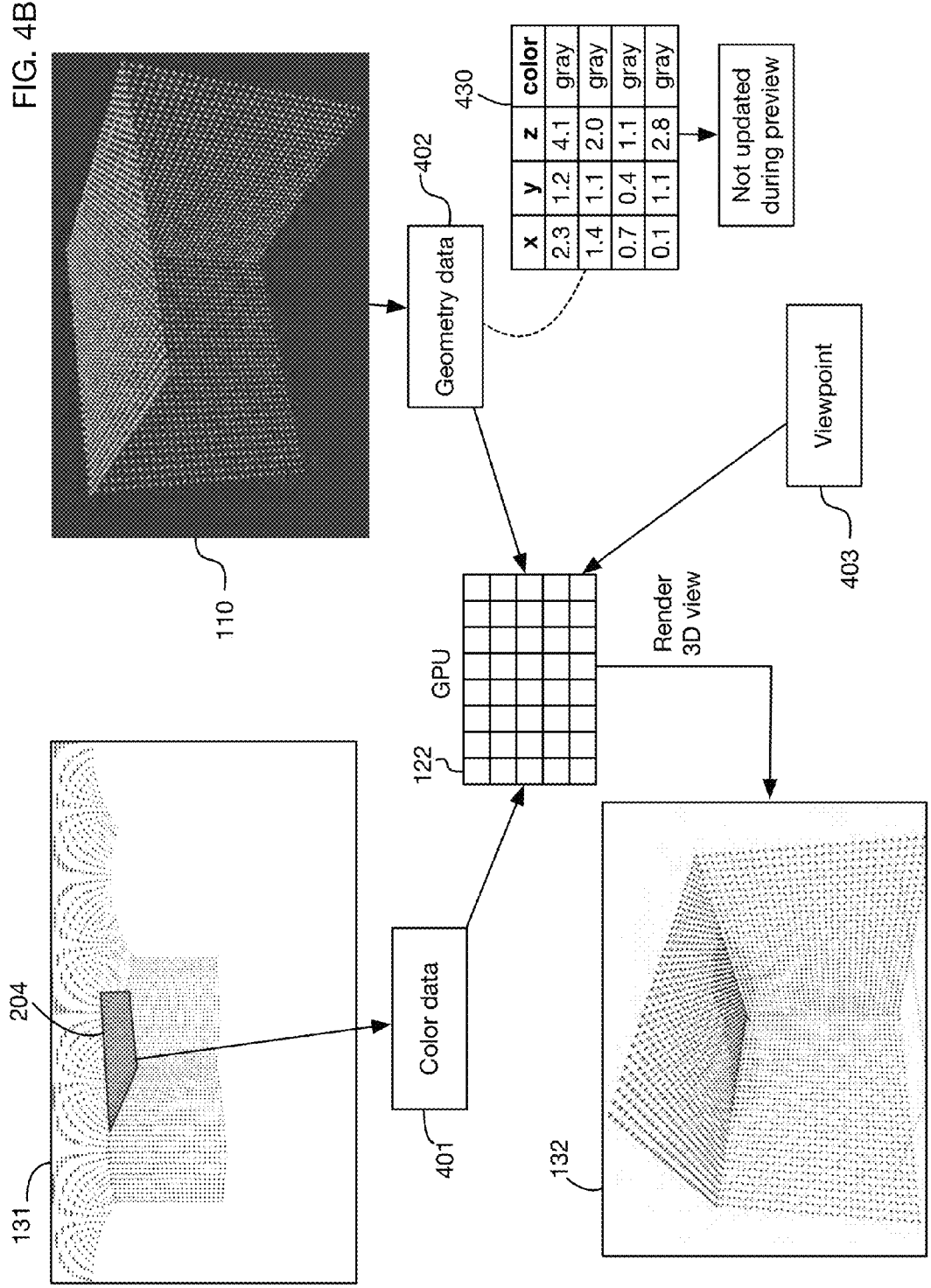

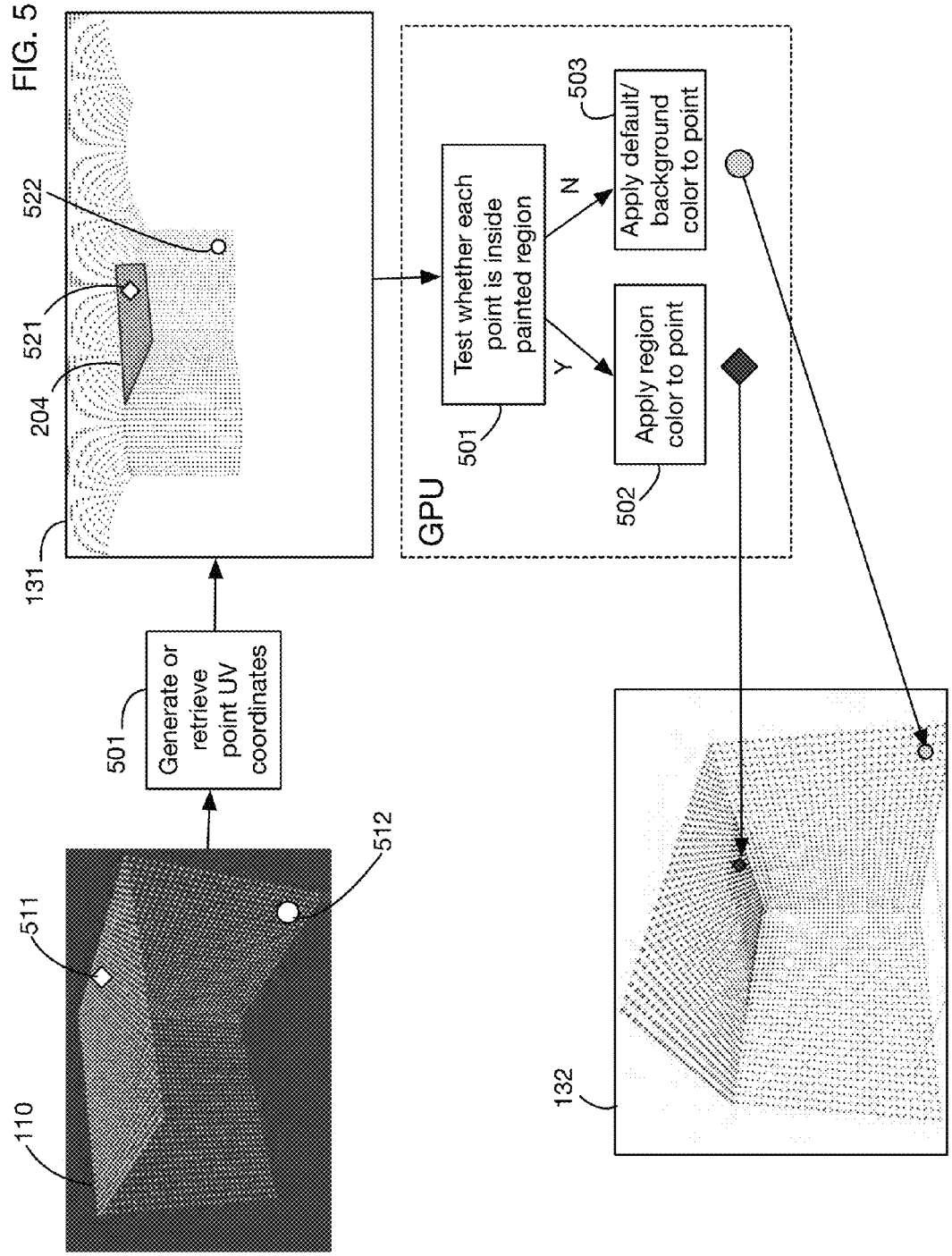

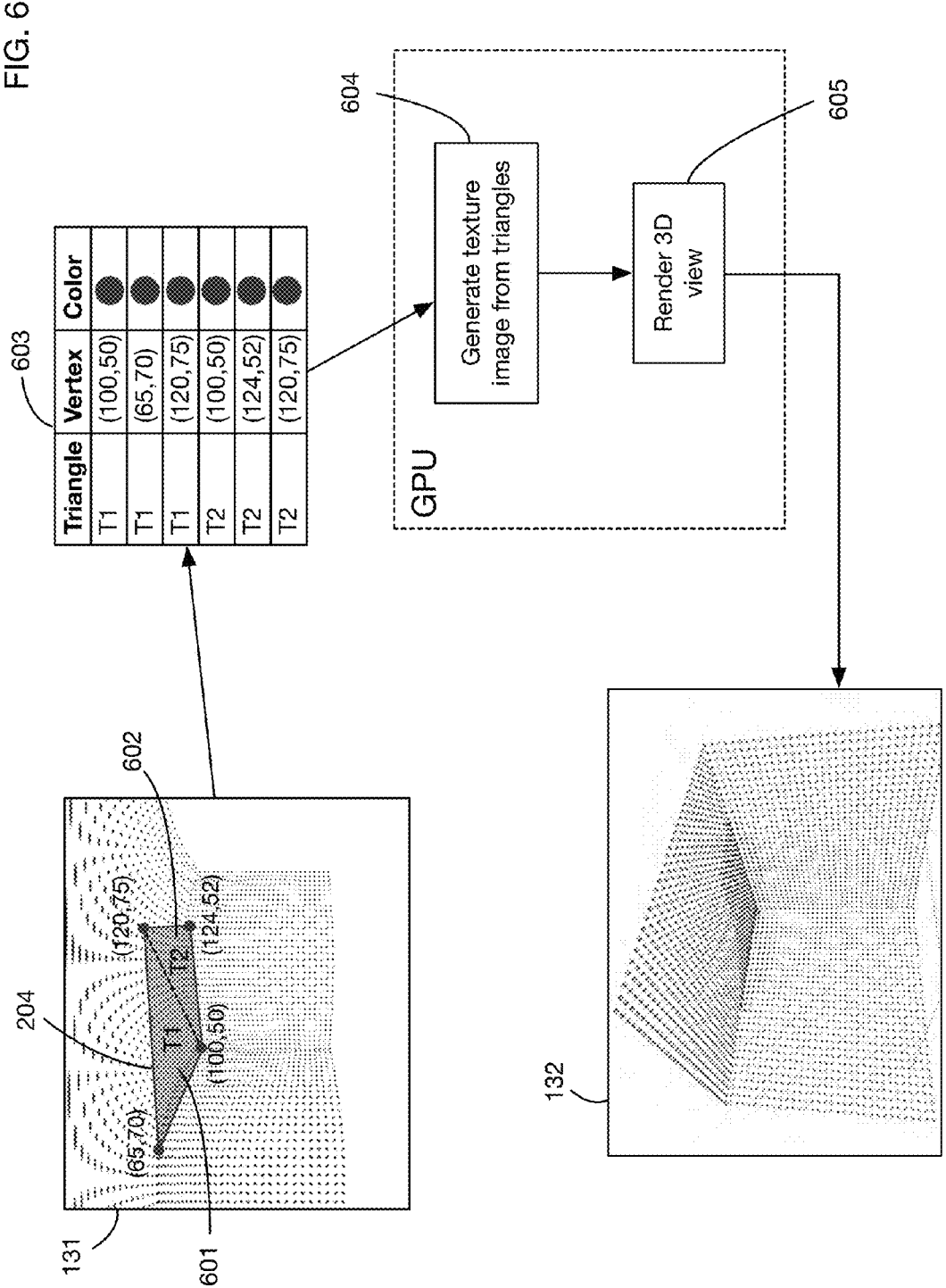

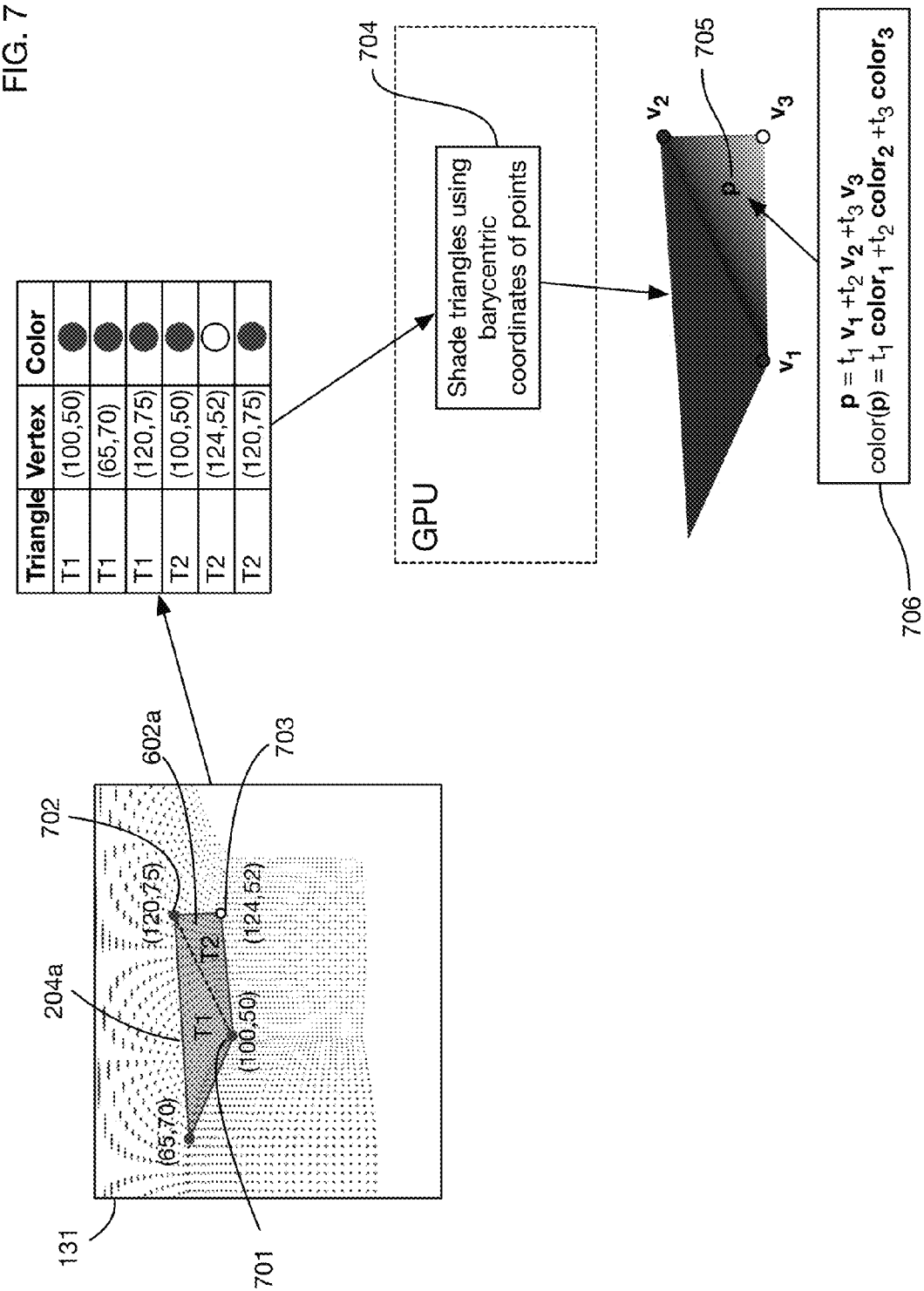

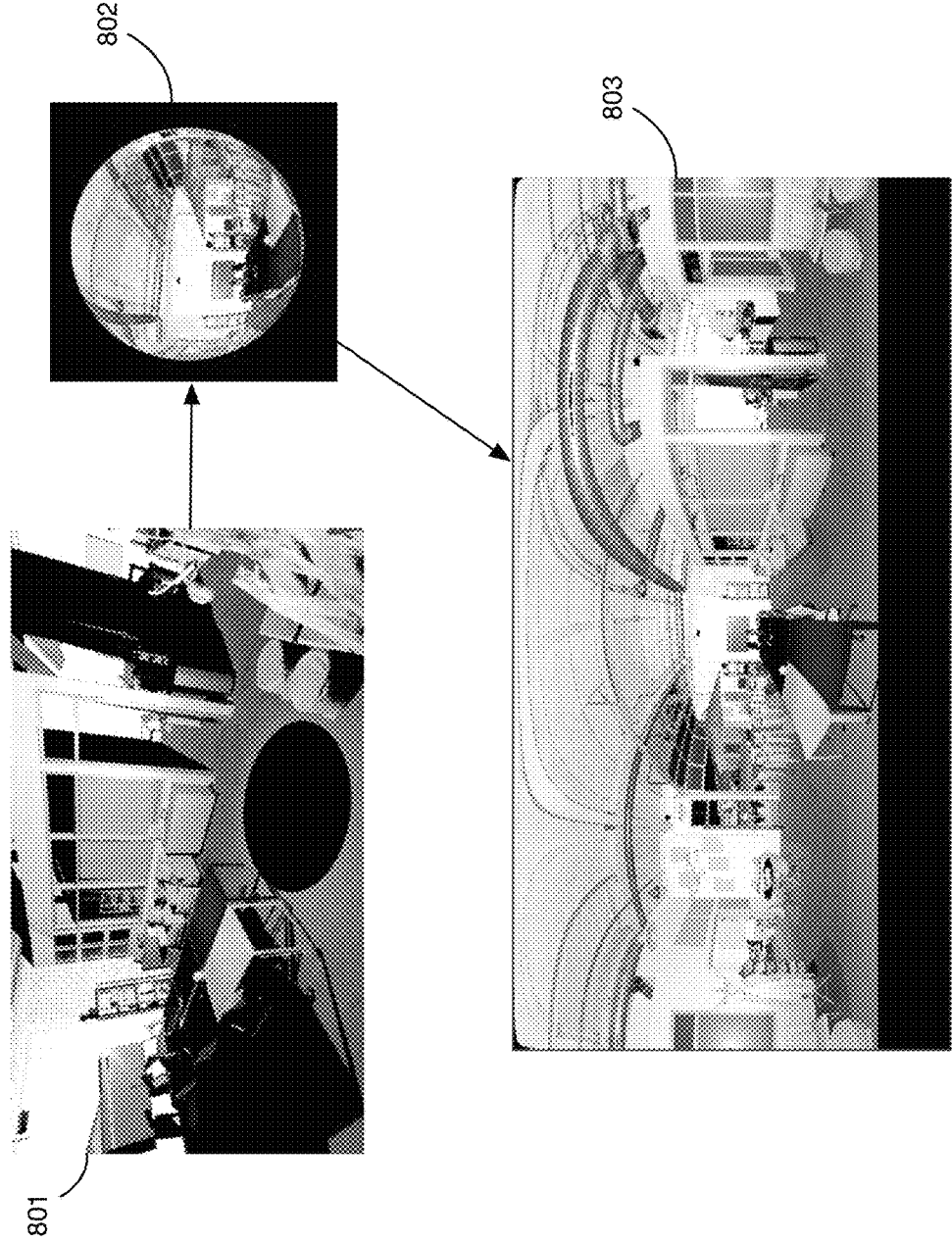

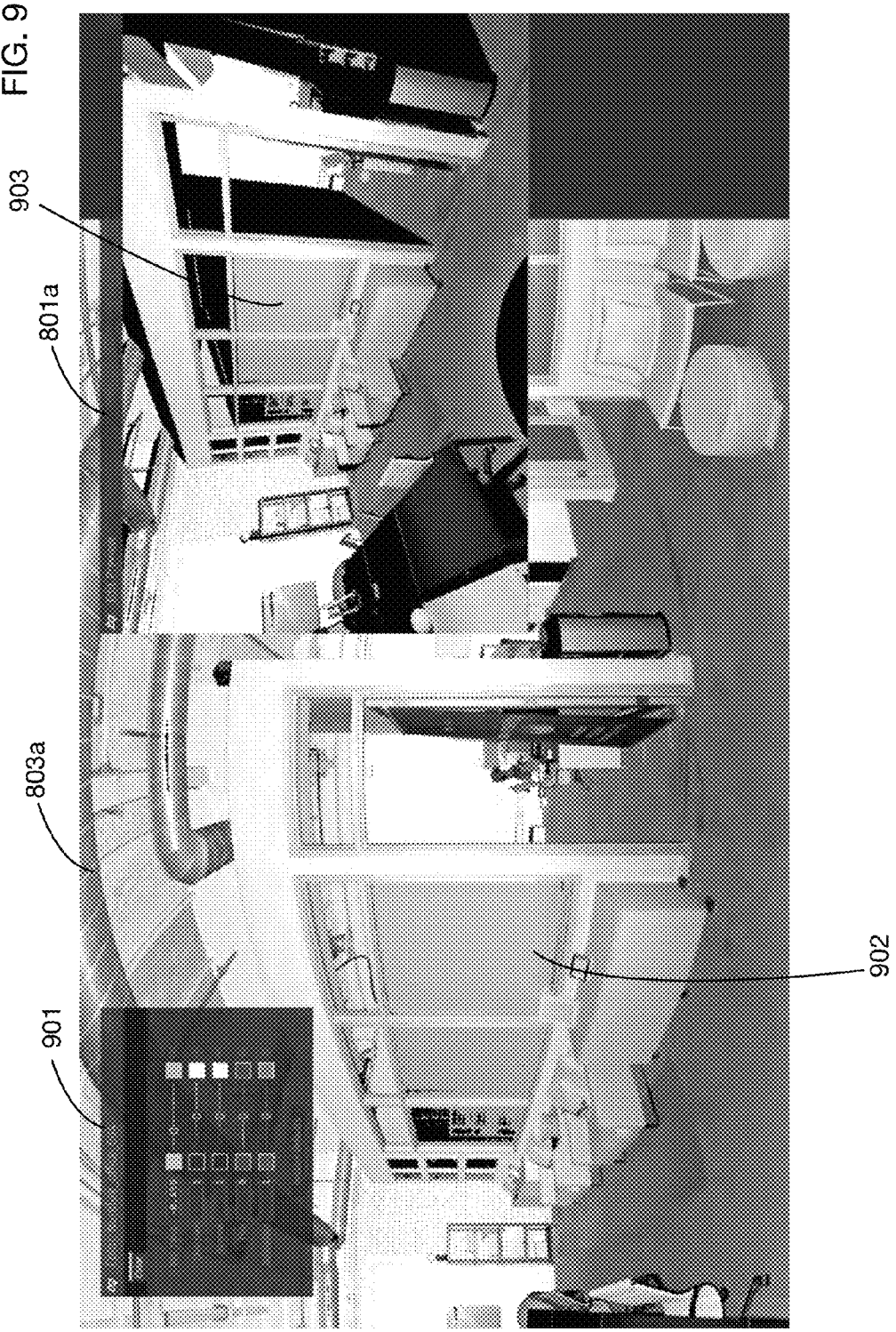

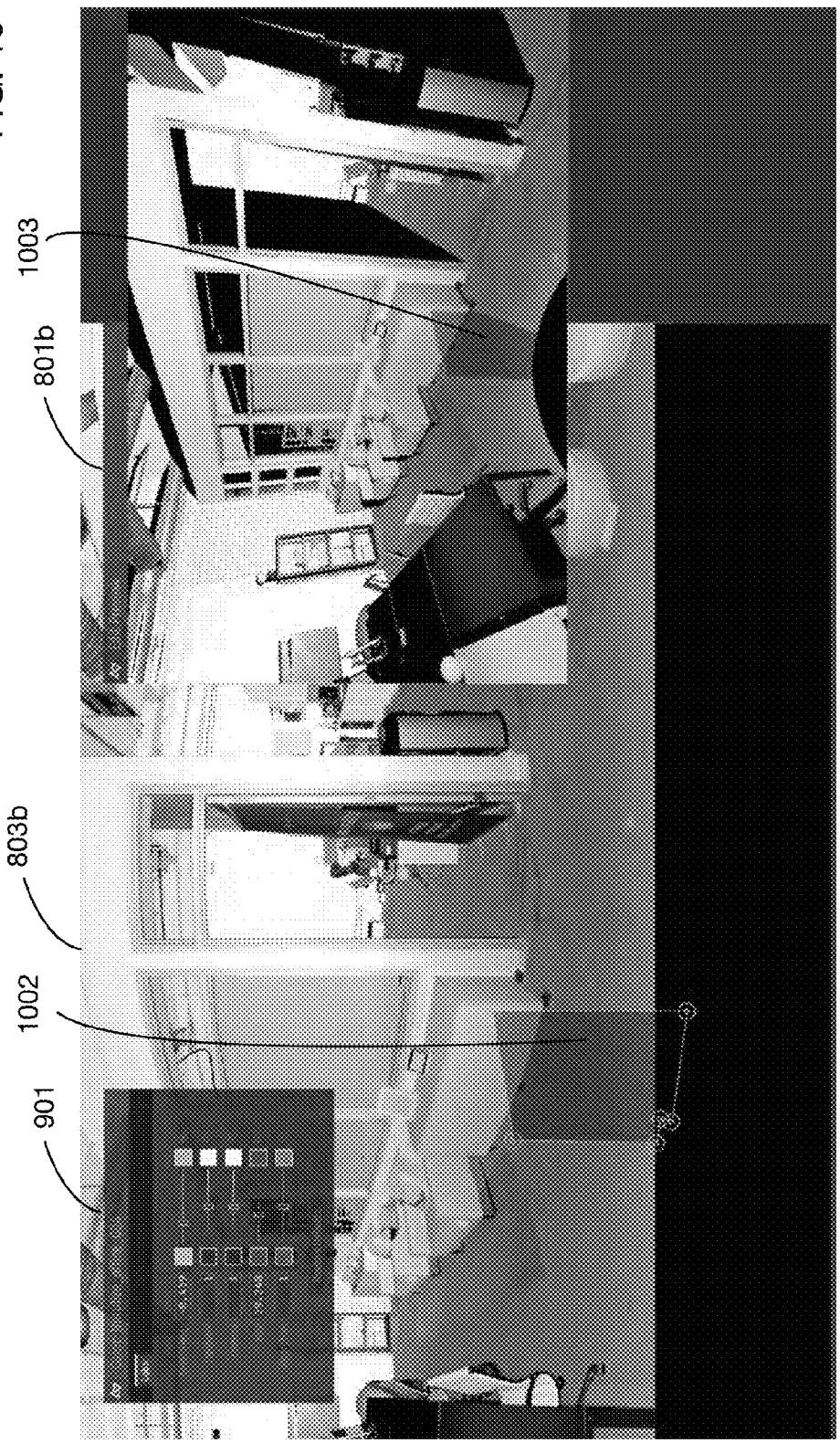

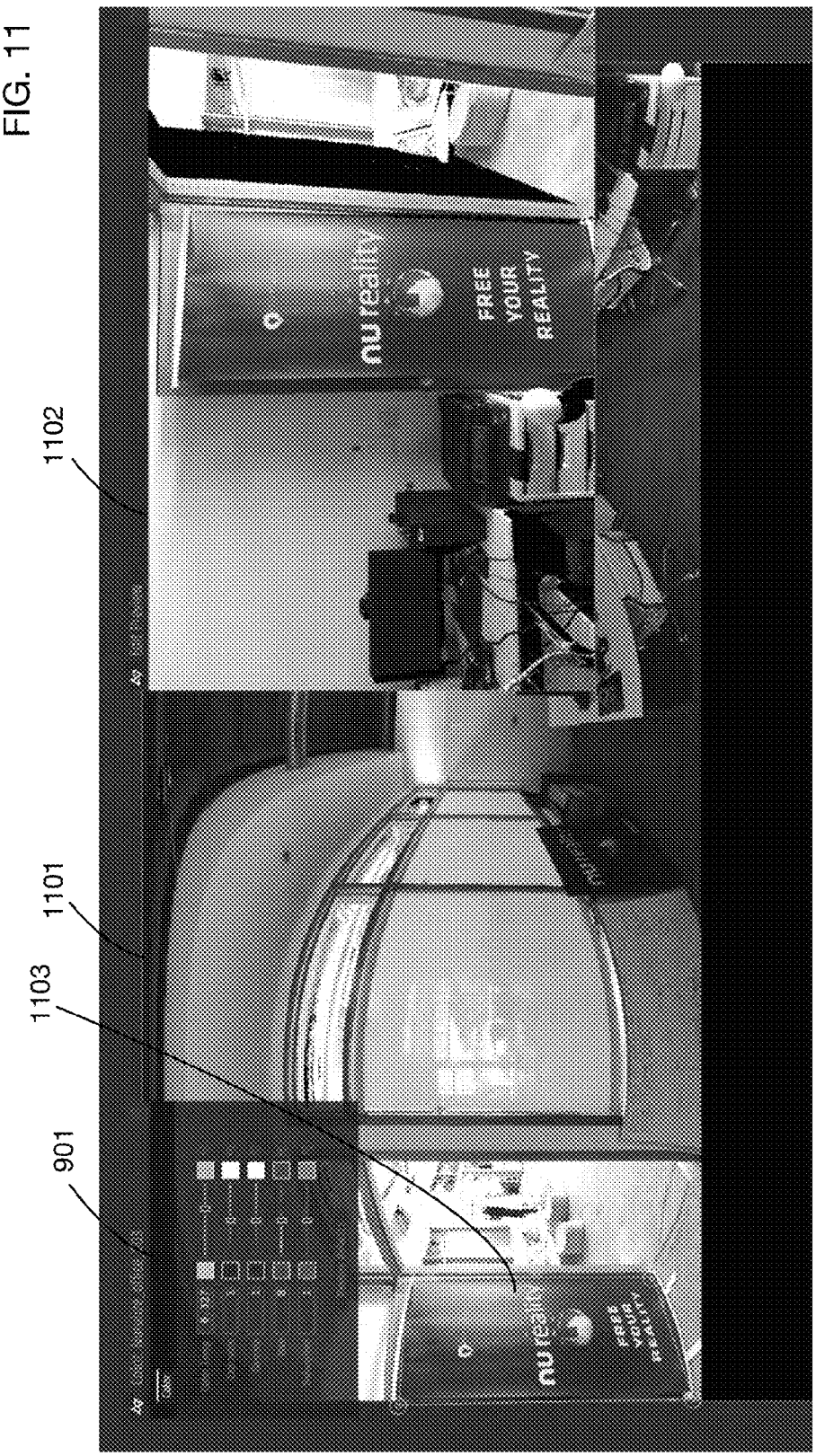

POINT CLOUD COLORIZATION SYSTEM WITH REAL-TIME 3D VISUALIZATION

BACKGROUND OF THE INVENTION

Field of the Invention

One or more embodiments of the invention are related to the fields of computer graphics and virtual reality. More particularly, but not by way of limitation, one or more embodiments of the invention enable a point cloud colorization system with real-time 3D visualization.

Description of the Related Art

Systems to construct 3D models of an environment from point cloud data are known in the art. However, 3D scanners such as LIDAR systems typically capture only surface geometry information and possibly grayscale intensity; they do not capture color. Construction of a realistic 3D environment requires augmenting 3D point clouds with color information, for example from color 2D photographs. Colors may require manual adjustment, for example to correct for lighting condition variations in photographs, or for artistic effect.

Existing systems for colorizing point clouds take color adjustments from a 2D view (such as color adjustments in Photoshop® for example), and then bake the color onto the 3D point cloud via a batch process, which may be time-consuming. Baking the color onto the point cloud attaches a color value to every point in the point cloud. With point clouds containing potentially millions or billions of points, updating the color of every point in the cloud may take many minutes or hours. After the 3D point cloud is updated, the user may inspect the 3D cloud to ensure that the color selections (in 2D) line up with the desired objects, structures, or boundaries in the 3D point cloud. Because of the warping that occurs in mapping between a 3D point cloud and a 2D view, it may be difficult for a user to select the appropriate region in a 2D view to make the desired color changes to the 3D point cloud. Therefore, multiple iterations of these color changes are often necessary. Each iteration requires making color changes in 2D, waiting for a potentially time-consuming baking of these changes into 3D, and reviewing the changes in 3D. There are no known systems that provide a simple method to manually adjust colors in 2D images that are applied to 3D point clouds and to preview the effects of these changes in 3D in real-time or almost real-time.

A system that provided real-time previews in 3D point clouds of color changes made in 2D would dramatically improve the efficiency of the color adjustment process.

For at least the limitations described above there is a need for a point cloud colorization system with real-time 3D visualization.

BRIEF SUMMARY OF THE INVENTION

One or more embodiments described in the specification are related to a point cloud colorization system with real-time 3D visualization. 3D point cloud data may be augmented with color information by drawing on a 2D projection of the point cloud; the resulting colored 3D points may be previewed in a 3D view. The 3D preview may be available in real-time or almost real-time, increasing the efficiency of the colorization process.

One or more embodiments include or use a computing system that may contain for example one or more processors, a memory, and a display. The processor or processors may include a CPU, a GPU, or combinations thereof. The processor may obtain a 3D point cloud and display a 3D view window of the point cloud on the display. The viewpoint from which the 3D point cloud is viewed may be modifiable by the user of the system. The processor may project the 3D point cloud onto a 2D plane to form a 2D view window that is also displayed on the display. The projection may associates each 3D point of the point cloud with a corresponding projected point in 2D. The user may draw a region on the 2D view and apply a color to the region. The processor may then update the 3D view window to show the 3D points corresponding to the region in that color. When a 3D point has a corresponding projected point that is inside the region, and when that 3D point is visible from the viewpoint selected by the user, then that 3D point may be displayed in the color of the region. The 3D view window may be updated without updating the point cloud to associate the color with each 3D point corresponding to the region. The update to the 3D view may therefore occur in real-time or near real-time even for large point clouds; for example, typical delays for generating an updated 3D view in one or more embodiments may be on the order of milliseconds.

In one or more embodiments, the projection of the 3D point cloud onto the 2D plane may be an equirectangular projection. In one or more embodiments, the projection may include or may be followed by a scaling transformation to stretch or shrink the 2D size of the projected point cloud. For example, scaling may be used to cause the projected point cloud to fill an entire 2D window. The scaling transformation may match the horizontal extent of the point cloud to the horizontal width of the 2D view window, and may match the vertical extent of the point cloud to the vertical height of the 2D view window.

One or more embodiments may further filter the 2D view window, for example to eliminate or reduce artifacts in pixels for which there are no projected points from the point cloud. In order to assign a pixel color to these pixels, a filter may use colors of neighboring pixels. For example, an averaging convolutional filter may be used in one or more embodiments.

In one or more embodiments the processor may include both a CPU and a GPU. The CPU may transmit the region and color selected by the user in the 2D view to the GPU, and the GPU may generate the 3D view window. The GPU may set the color of pixels corresponding to 3D points projected into the 2D region to the color selected by the user.

In one or more embodiments, the region selected by the user may be a polygon, and the processor may determine whether a projected point is inside the region using a point-inside-polygon test.

In one or more embodiments, the user may assign multiple colors to a region. The colors may be blended inside the region for example. The processor may assign a blend of the colors to each pixel in the 2D region and to each visible 3D point in the 3D view that corresponds to a projected point in the 2D region. As for single color regions, the 3D view may be updated without updating the 3D point cloud to associate the blended colors with 3D points. When the blended color region is a triangle, the colors assigned by the user may for example correspond to vertex colors for each triangle vertex. Colors of points within the triangle may be a weighted combination of the vertex colors, with the weights corresponding to the barycentric coordinates of each point.

In one or more embodiments, the processor may generate a texture image from the 2D view window, with an area in the texture image corresponding to the region selected by the user. This area in the texture image may be assigned the color of the region. Each pixel in the 3D view that corresponds to one or more 3D points with projected points in the region may be colored based on the texture image and on the texture coordinates of the projected points. For a polygonal region, the CPU may triangulate the region into triangles, and transmit the vertices of each triangle and the color to the GPU for rendering of the texture image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIG. 3A shows an illustrative method of rescaling a projected 3D point cloud so that the projected cloud fills an entire 360-degree×180-degree image.

FIG. 3B shows an illustrative method of filtering a 2D image to remove artifacts that may occur when no points in a point cloud correspond to a 2D pixel.

FIG. 4B shows an illustrative architecture for combining point cloud geometry data and color data from user modifications to the 2D view to render a colored 3D preview in real-time using a GPU.

FIG. 5 shows an illustrative method that may be used in one or more embodiments to determine the color of a pixel by testing whether a point is inside a colored region in the 2D view.

FIG. 6 shows a different method that may be used in one or more embodiments to color pixels by triangulating a colored 2D region and passing vertex colors to the GPU for rendering of a texture image.

FIG. 7 shows an example of applying a color gradient to a region by interpolating colors among triangle vertices.

FIG. 8 shows an example of a point cloud captured from an office environment and converted to a 2D view with an equirectangular projection.

FIG. 9 shows the point cloud of FIG. 8 with a region colored in the 2D view and previewed in a 3D view.

FIG. 10 shows another example of colorizing the point cloud of FIG. 8, illustrating that a polygonal region in 2D may be deformed significantly in the 3D view.

FIG. 11 shows an example of applying a photo to a point cloud, and modifying the color of part of the photo.

DETAILED DESCRIPTION OF THE INVENTION

A point cloud colorization system with real-time 3D visualization will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
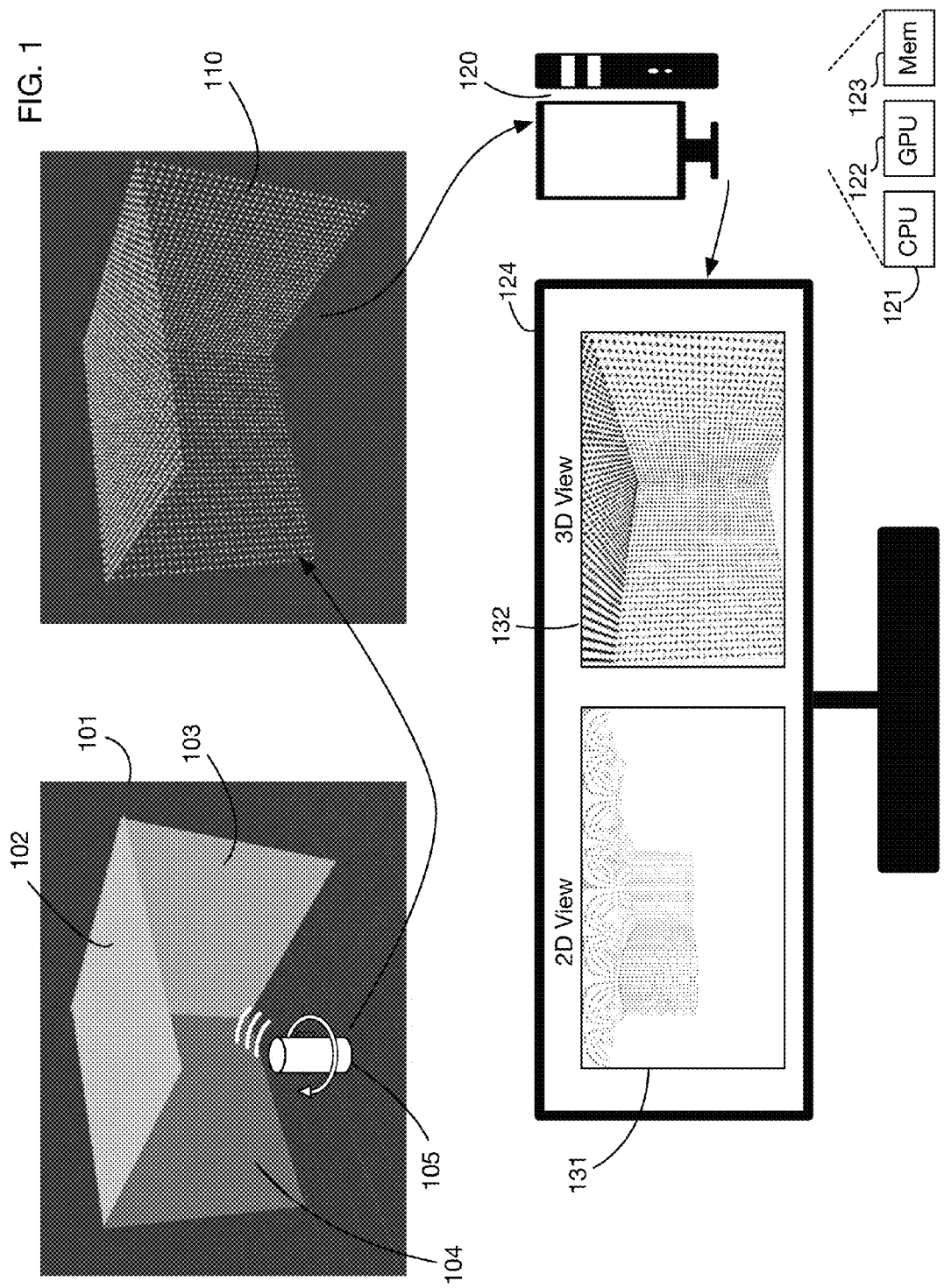
FIG. 1 shows an embodiment of the invention that processes point cloud data from a room and displays a 2D view and a 3D view of the point cloud.

FIG. 1 shows an embodiment of the invention that obtains 3D point cloud data and displays the data in both 2D and 3D views. A scene 101 may be scanned, for example with a LIDAR or similar 3D scanner 105. One or more embodiments may obtain and use point cloud data obtained from any type of scanner or any source, including but not limited to LIDAR scans. For ease of illustration, the example scene 101 has only three objects: ceiling 102, front wall 103, and left wall 104. Real scenes processed by embodiments of the invention may have any degree of detail and complexity. Scenes may include for example, without limitation, rooms, buildings, arenas, halls, theaters, markets, stores, natural scenes, streets, cities, or countryside. In one or more embodiments, scenes may be completely or partially artificially generated.

Scanner 105 generates 3D point cloud data 110. In one or more embodiments, point cloud data of any format may be obtained and processed. Each point in a point cloud may be associated with a 3D position. Some point clouds may include additional data, such as luminance intensity or other attributes obtained by scanner 105 or added from other sources. Embodiments may work directly with point cloud 110, or in one or more embodiments the point cloud data may be transformed into other formats such as for example a mesh. 3D point cloud 110 is transmitted to computer 120, which may process the data for display and for color modification, as described below. In one or more embodiments, computer 120 may be any device or devices with processing capability, such as for example a desktop computer, a laptop, a notebook, a server, a mobile phone, a smartphone, a smart watch, smart glasses, a virtual reality headset, an embedded system, or any combinations thereof. In one or more embodiments computer 120 may be a network of multiple computers or devices that collectively process, store, or display data. Computer or computers 120 may contain for example one or more CPUs 121, one or more GPUs 122, and one or more types of memory 123. Processing of data may be performed on a CPU, a GPU, or both.

Point cloud 110 is shown with a relatively small number of points for ease of illustration. In typical applications, point clouds of millions or billions of points may be processed. The very large potential size of point clouds poses a challenge to workflows that process these clouds, since updates to point clouds may be very time-consuming. As described below, the invention addresses this challenge for the workflow of colorizing the point cloud by providing an efficient 3D preview of color changes that does not require a time-consuming update of the point cloud.

Computer 120 processes 3D point cloud 110 and may generate one or more windows to display the point cloud information. These windows may be shown for example on a display or displays 124. In the example shown in FIG. 1, computer 120 generates a 2D view 131 and a 3D view 132 of point cloud 110. These windows may be shown for example on a single display, or in separate displays that may be arranged in any desired manner. Windows 131 and 132 may be arranged in any fashion, such as side-by-side, top-to-bottom, overlapping, or picture-in-picture. 3D view 132 may for example display a perspective or orthographic projection of the point cloud 110 from any desired viewpoint. The viewpoint may be controllable by the user, so that the user can pan, rotate, and zoom within the 3D environment to view different parts of the point cloud from any desired angle and at any desired scale. 2D view 131 may for example contain a 2D panoramic projection of the entire point cloud 110. In one or more embodiments the user may be able to pan and zoom within the 2D view 131 to focus on different parts of the point cloud.

In one or more embodiments, point cloud 110 may not contain color information. In some applications it may be desirable to add color information to the point cloud, for example to generate a colored 3D virtual reality environment based on a scanned scene. Color photographs of the scene may be for example overlaid onto the point cloud to provide color. However, manual adjustment of colors may be desirable in many situations, even if color photographs are used to provide a colorization baseline. For example, if multiple photographs are used to color a scene, lighting and color balance across photographs may vary; manual color adjustment may therefore be needed to blend these photographs together into a coherent colored 3D environment. Artists may also want to change colors of certain objects in the scene to achieve specific effects, such as highlighting selected objects.

Figure 2:
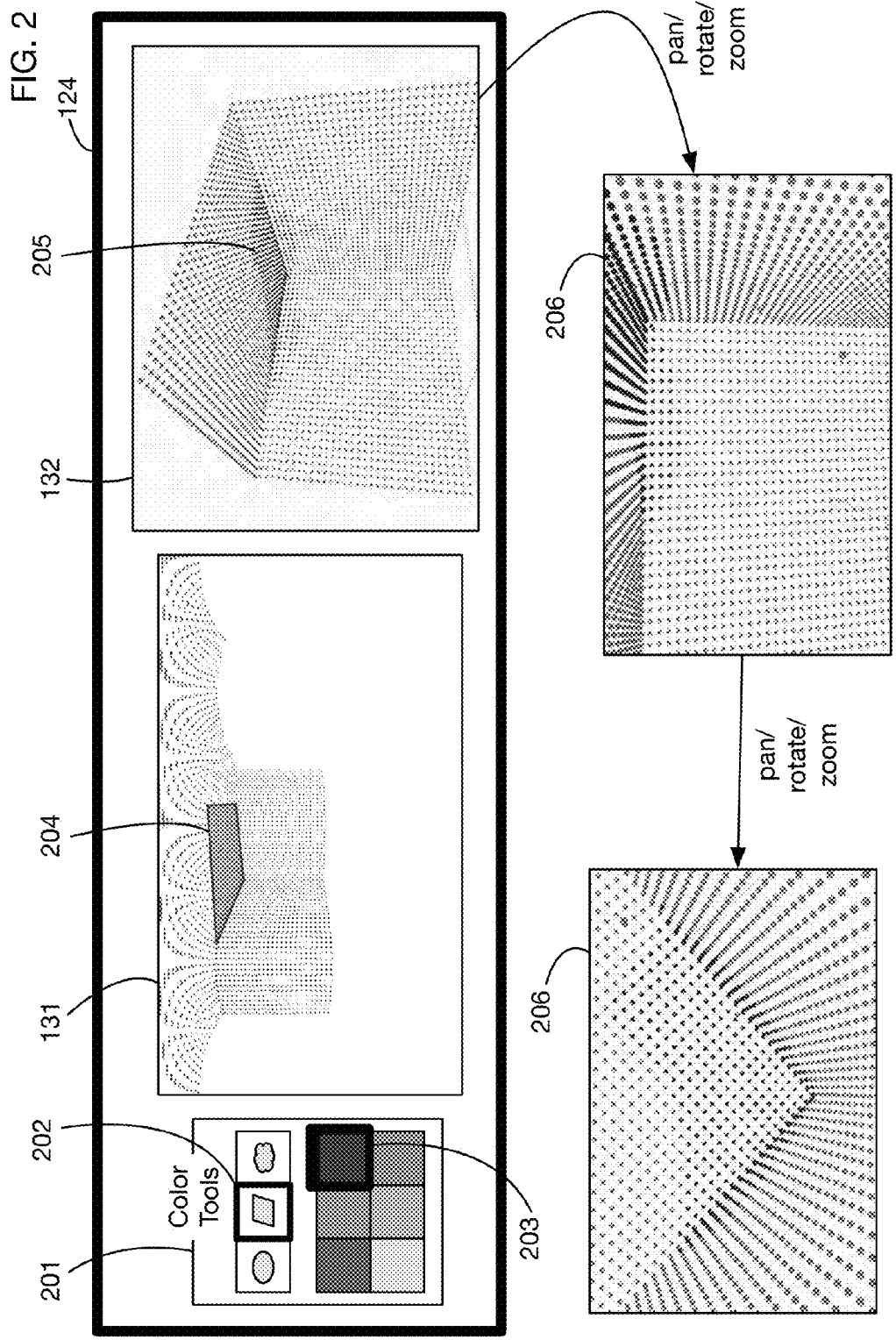
FIG. 2 continues the example shown in FIG. 1, illustrating painting color on a 2D view of a point cloud, and previewing these color changes in a 3D view.

FIG. 2 continues the example shown in FIG. 1 to show colorization of selected points in the 3D point cloud. The user interface shown on display or displays 124 may include for example one or more color tools 201 that enable a user to draw colors onto the 2D view of the point cloud. Any type of color tools may be used, including for example, without limitation, color selectors, paintbrushes, shape palettes, and freehand drawing tools. In the embodiment shown, the user uses the color tools 201 to draw and color a region 204 on the 2D view 131. The user selects the type of region to draw, and selects a color 203 for the region. For ease of illustration, only a few options are shown in tools 201 for region shape and color; in one or more embodiments, many types of regions may be selectable, and color selection tools may allow the user to select any desired color, including colors with alpha channels for example.

The user draws a region 204 on the screen, and fills it with color 203. In one or more embodiments the user may fill the region with multiple colors, including for example gradients, blurs, or textures. Because the 2D view 131 may be distorted, particular at the poles of the projection, the appearance of region 204 in the 2D view may not reflect the 3D shape of the region when mapped back to the 3D point cloud. Therefore, in one or more embodiments 3D view 132 may provide a preview of the color changes in 3D. In one or more embodiments the updates to the colors of 3D view 132 may be in real-time or near real-time, so that the user obtains immediate or almost immediate feedback on the effect of the color changes on the 3D point cloud. Therefore points 205 in 3D view 132 are shown in color 203, since these points correspond to the projected points inside region 204. In one or more embodiments the user may be able to pan, rotate, zoom, or otherwise modify the viewpoint of the 3D window 132. For example, the user may zoom in on the front wall to see view 206 from this viewpoint, or zoom in on the ceiling to see view 207 from this viewpoint.

Figure 3:
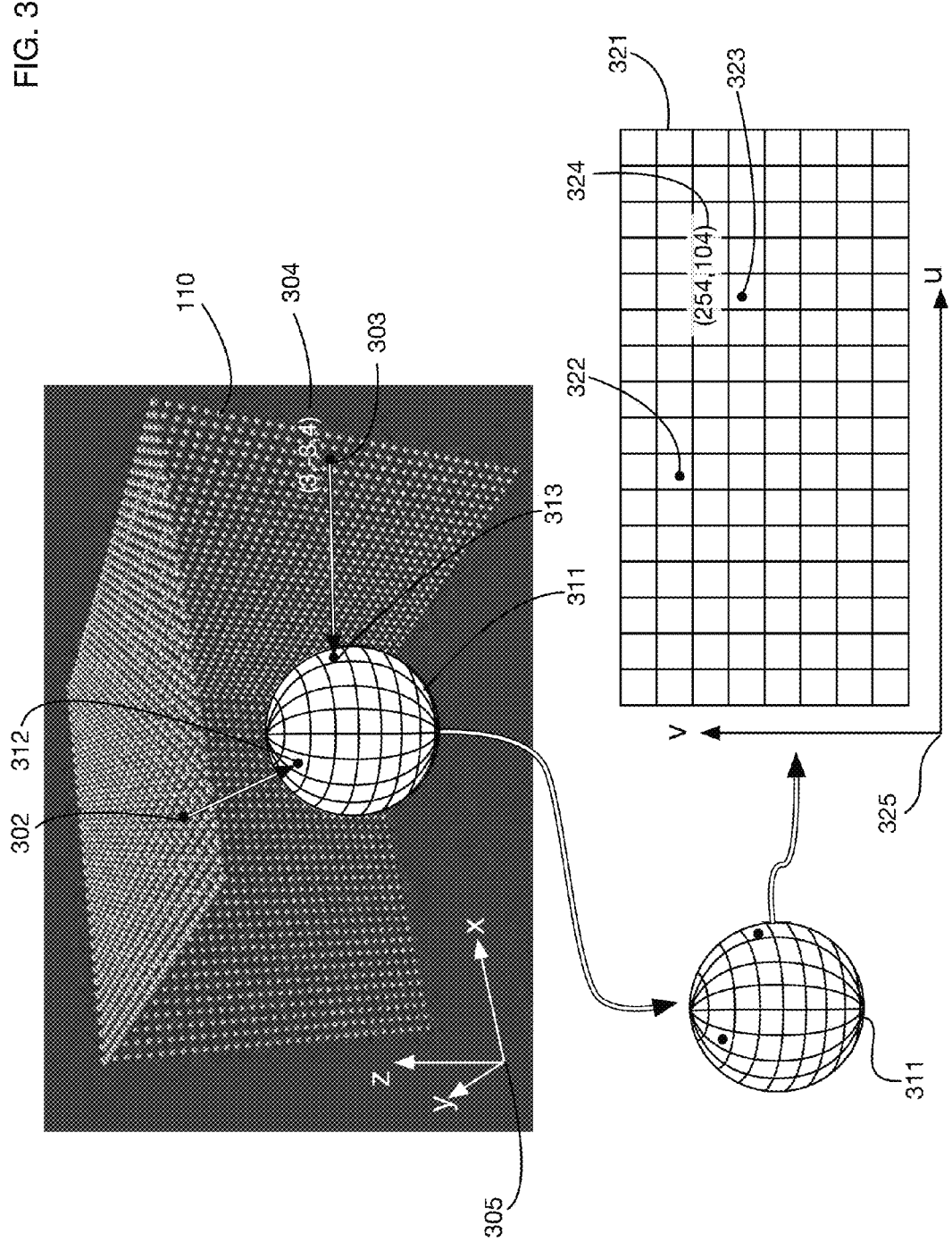
FIG. 3 shows an illustrative method for projecting a 3D point cloud onto a 2D view using a panoramic projection.

FIG. 3 provides details on how a 2D view window may be generated in one or more embodiments. The method illustrated in FIG. 3 is illustrative; one or more embodiments may generate a 2D view of a point cloud using any desired projection or method. Points of 3D point cloud 110 may be first projected onto a sphere 311. The center of the sphere may coincide for example with the center of the LIDAR or other scanner used to capture the 3D point cloud of the scene, or it may represent a point of interest from which a user wants to view a scene. For example, 3D point 302 in the point cloud may be projected onto point 312 on sphere 311, and 3D point 303 may be projected onto point 313 on sphere 311. As a second step, sphere 311 may be unwrapped onto a flat 2D space 321. Any type of projection may be used to map from sphere 311 to flat space 321. For example, without limitation, a panoramic equirectangular projection may be used, which maps each point's longitude and latitude to 2D cartesian coordinates. With this projection, point 312 on the sphere may be mapped to point 322 in 2D space 321, and point 313 on the sphere may be mapped to point 323 in 2D space 321. The combination of projecting 3D points onto sphere 311 and projecting the sphere 311 to 2D space 321 establishes a correspondence between 3D ("xyz") coordinates in 3D reference frame 305 and 2D ("uv") coordinates in 2D reference frame 325. For example, point 303 at 3D coordinates 304 corresponds to point 323 at 2D coordinates 324. This correspondence may be reversed, so that a point in 2D space 321 may be associated with a point in 3D point cloud 110.

In some scenarios the point cloud, or a portion of the point cloud that is of interest, may not cover an entire 360 degrees of azimuth or 180 degrees of elevation. In one or more embodiments, the 2D view of a point cloud may be modified to rescale the 2D view so that the point cloud fills the entire 2D viewing window, even if the extent of the point cloud is limited. This scenario is illustrated in FIG. 3A, where from the point of an observer at the center of sphere 311, point cloud 110a spans only a horizontal extent of 331 and a vertical extent of 332. When mapped to 2D view 321a, point cloud 110a occupies area 333. To provide a 2D view of the point cloud that is as detailed as possible, in one or more embodiments the 2D projection may be transformed with scaling operation 334 to obtain 2D view 321b. Scaling may for example be used to match the horizontal extent 331 with the width of the 2D view window 321b, and to match the vertical extent 332 with the vertical height of the 2D view window 321b. In this transformed view, point cloud 110a occupies region 335, which has a full 180 degrees of elevation and 360 degrees of azimuth. The scaling factors for the vertical and horizontal axes may be different, depending on the horizontal extent angle 331 and the vertical extent angle 332; therefore the area 335 may be distorted relative to the original projected area 333.

The distortion introduced by 3D to 2D projection and by possible rescaling of axes, as well as the discrete sampling in the original point cloud, may generate artifacts when the 2D view of the point cloud is rasterized. This situation is illustrated in FIG. 3B. Point cloud 110a is projected onto 2D view 321b, and rescaled, so that it occupies area 335, as described with respect to FIG. 3A. This view 321b is then rasterized into a 2D image. Grid 342 shows individual pixels in a region 341 of the rasterized image. Points in grid 342 are the projected position of points from the 3D point cloud 110a. Because some pixels in grid 342, such as pixel 343, do not contain any projected points, artifacts such as the black pixels in rasterized image segment 344 may appear. For example, pixel 343 in grid 342 appears as pixel 345 in image segment 344. These artifacts may be more prevalent when 2D images are rescaled to fit the entire 360×180 image, since it may be more likely that some pixels do not correspond to any projected points from the 3D point cloud.

In one or more embodiments, artifacts such pixel 345 in image 344 may be reduced by identifying pixels without corresponding projected points, and by setting the value of those pixels to a value corresponding to neighboring pixels. One technique that may be used in one or more embodiments is to convolve a filter with the image. In the illustrative example shown in FIG. 3B, image 344 is convolved in operation 346 with filter 347, which averages the pixels surrounding the artifact pixel. This operation 348 results in an artifact-free image 348. This averaging filter 347 is illustrative; one or more embodiments may apply any type of filter or other operation to identify pixels containing artifacts and to eliminate or reduce them.

Figure 4A:
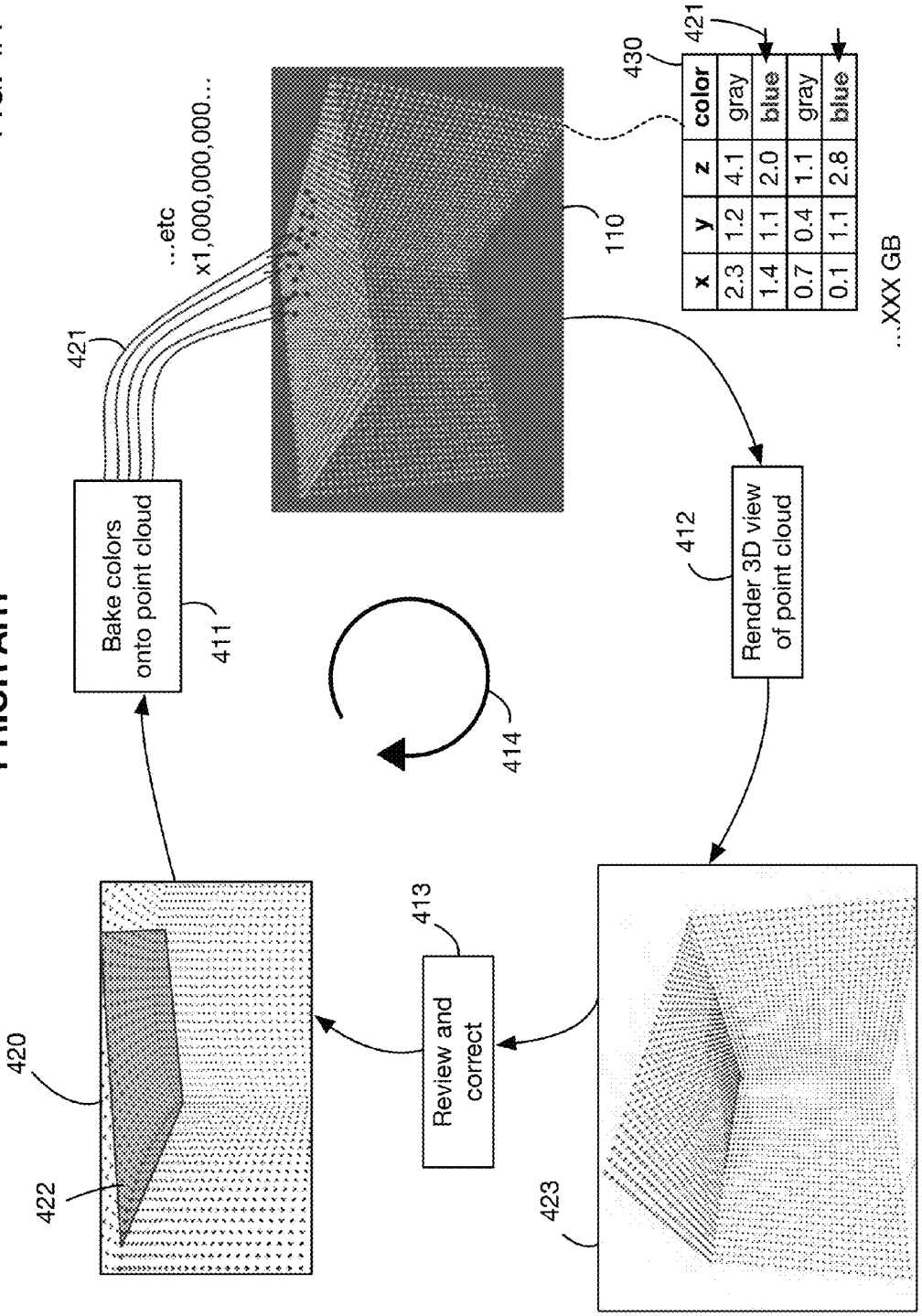
FIG. 4A shows a prior art method of viewing point cloud colorization that involves baking colors onto the point cloud and then rendering; this process may be iterative and time-consuming.

Turning now to the generation of the color 3D view from the color modifications made to the 2D view, FIG. 4A shows a typical method that may be used in the art to colorize a 3D point cloud. Some view 420 of a portion of a 3D point cloud is generated, and a user applies a color to some region 422 of this view. To observe the 3D effect of this color change, process 411 is executed to "bake" the color onto the 3D point cloud 110. This baking process identifies all of the 3D points affected by the color change, and it applies a series of updates, such as update 421, to modify a color attribute of the affected points, or to otherwise associate a color with the points in the point cloud. Because the point cloud may be large, containing potentially millions or billions of points, these updates 421 may be very time consuming. The entire process of baking the colors onto the point cloud may for example take 15 minutes or more. An illustrative process represents the point cloud as data structure 430, with geometry and color information for each point. Accessing the affected points and updating their color attributes may require traversing gigabytes of data for large point cloud. After the baking process 411, the updated point cloud is rendered in process 412 to generate a 3D view 423. A user may then review this render in step 413, and may correct the colors as needed once the user sees the effect of the changes in 3D. Because this process may be very time consuming, several iterations 414 may be required to accurately modify the colors of the point cloud.

FIG. 4B shows a general framework for rendering the 3D view that may be used in one or more embodiments. In contrast to the process illustrated in FIG. 4A, this framework provides real-time or near real-time generation of a 3D view, thereby potentially eliminating or reducing the multiple iterations of the workflow of FIG. 4A. Color data 401 is obtained from the colored regions in 2D view 131, such as region 204. This color data may be for example a description of the boundary of region 204, which may include vertices, edges, or both. It may also be a parametric representation of the region or the region boundary. It may alternatively be a list of all pixels or points contained in the region. The color data may include the color of the region or the colors associated with different points or areas within the region. Geometry data 402 is obtained from the 3D point cloud 110. This data may be for example the 3D coordinates of each point, or it may be a mesh derived from the point cloud. The user selects a viewpoint 403 from which the 3D view should be rendered. The data 401, 402, and 403 may be used by GPU 122, or by any other processor or processors, to render the 3D view 132 with the colors applied to the 3D points that correspond to region 204. Rendering of 3D view 132 may also be performed by a combination of CPU processing and GPU processing.

Unlike the process shown in FIG. 4A, the process in FIG. 4B that is used in one or more embodiments of the invention does not update the point cloud data 430; colors are not "baked" into the point cloud as part of the 3D preview process. Instead the color data from region 204 is transformed by the GPU (or by other processors) to show the point cloud with the color overlaid in the correct position, orientation, and shape. This technique allows the 3D preview of the color changes to occur almost immediately. Depending on the application, final colors may still be baked into the point cloud after editing, but this is not needed during editing and previewing.

FIGS. 5 and 6 illustrate methods that may be used to render 3D view 132 in one or more embodiments. FIG. 5 illustrates a method that tests whether each 3D point in point cloud 110 has a 2D projection that is within colored region 204. For each 3D point, the coordinates in 2D projection 131 are retrieved or generated in step 501. For example, in one or more embodiments the 2D ("uv") coordinates of the projection may be stored with the point cloud as an attribute of each point. Alternatively, a projection may be performed when needed to create the 2D coordinates. After projecting, a test 501 may be performed for each projected point to determine whether it is inside a colored or painted region. If region 204 is a polygon for example, then any algorithm that tests whether a point is inside a polygon may be used. Several such algorithms are known in the art and may be used in one or more embodiments. For example, point-inside-polygon tests include algorithms that count the number of times a ray from the point crosses the polygon boundary, and algorithms that calculate a winding number of the polygon surface around the point. If the projected point associated with a 3D point is inside the region 204, step 502 applies the region color to the point; otherwise step 503 applies a default or background color, or the color of a background image applied to the point cloud.

FIG. 5 illustrates the process of determining the color of two points, 511, and 512, in 3D point cloud 110. Point 511 has associated projected point 521, and point 512 has associated projected point 522. The test 501 shows that point 521 is inside region 204, and that point 522 is outside region 204; hence point 511 is colored blue in the 3D view 132, and point 512 is set to a default color.

In one or more embodiments, any or all of the steps shown in FIG. 5 may be executed on a GPU. The point inside region tests are easily parallelized, since the tests for each point may be performed independently of one another. In one or more embodiments additional optimizations to the tests may be performed. For example, a bounding box may be calculated around region 204, and a simple test may determine whether a projected point is inside the bounding box; the more complete point-inside-region test may then be performed only if the point is inside the bounding box. Another optimization that may be used in one or more embodiments is to divide 2D space 131 into tiles, and to determine for each tile whether it intersects region 204. 3D points with projections in a tile that does not intersect region 204 may then be colored in step 503 without a more complex test for whether the point is inside the region.

FIG. 6 illustrates another method for coloring points in the 3D view that may be used in one or more embodiments. Region 204 may be divided into triangles, and the triangle vertices and colors may be transmitted for example to the GPU to render a texture image. For example, region 204 may be divided into triangles 601 and 602, and the triangle data 603 may be transmitted to the GPU. Data 603 may include for example the coordinates of each triangle's vertices and the color of each vertex. In this example all vertices have the same color; however different vertex colors may be used for example to achieve blending or feathering effects, as described below with respect to FIG. 7. The GPU may then perform rendering 604 of a 2D texture image, and rendering 605 of the colored 3D view 132. Since GPUs are optimized for rendering from triangle vertex data, these steps may be performed very efficiently.

In one or more embodiments, region colors may be nonuniform across the region. This capability may for example be used to provide a soft edge to a region so that colors blend smoothly with other colors applied to the 2D view, such as one or more color photographs or other manual color changes. FIG. 7 shows an example with a color gradient in triangle 602a of region 204a. Two vertices 701 and 702 of triangle 602a are assigned a blue color, and the third vertex 703 is assigned a white color. The GPU performs a shading operation 704 to determine the color of each point within the triangle. This shading algorithm may for example use blending based on barycentric coordinates of each point. For example, the barycentric coordinates of point 705 may be used to calculate the color of this point. This type of triangle shading is commonly performed in a GPU, so it may be done very efficiently.

FIGS. 8 through 12 illustrate applications of an embodiment of the invention to 3D point clouds captured from real scenes. FIG. 8 shows a portion 801 of a 3D point cloud obtained by scanning a room in all directions. The point cloud has intensity and position for each point, but no color. As described above, the point cloud 801 is mapped to a sphere 802, which is then projected using an equirectangular panoramic projection to 2D view 803. FIG. 9 shows an illustrative user interface that is used to color a region of the point cloud. The main window 803a is the 2D view, zoomed in by the user to focus on a specific wall. Coloring tools 901 are presented to the user. The user selects a region 902 in the 2D view 803a and assigns a color to it. 3D view window 801a shows the point cloud with the corresponding region 903 in the same color.

FIG. 10 shows another example of coloring a region in the 2D view of the point cloud from FIG. 8. In this example, distortion in the 3D to 2D mapping is more apparent, illustrating the importance of the 3D preview. The user draws region 1002 in 2D view 803b and assigns a color. The corresponding region 1003 in 3D view 801b has a significantly different shape; straight lines in region 1002 do not correspond to straight lines in the region 1003 of the 3D view.

FIG. 11 shows another example of applying color to a region. In this example a 2D color image has been applied over point cloud data, and a user makes an adjustment to these colors. The sign 1103 is black in the 2D color image, but the user draws a region boundary around the sign in 2D view 1101 and changes the color to a blue hue. This color change is reflected in 3D view 1102.

Figure 12:
FIG. 12 shows an example of blending colors in a region or part of a region, which may for example be used to create a soft fall off area at the edge of a region.

FIG. 12 shows an example of color blending to achieve a soft edge to a region. The user fills region 1201 in 2D view 803c with a color, and defines another region 1202 with a color gradient to have the color of 1201 gradually fall off towards the right edge of region 1202.

While the invention herein disclosed has been described by means of specific embodiments and applications thereof, numerous modifications and variations could be made thereto by those skilled in the art without departing from the scope of the invention set forth in the claims.

What is claimed is:

1. A point cloud colorization system with real-time 3D visualization, comprising:
 a processor;
 a memory coupled to said processor; and,
 a display coupled to said processor and to said memory;
 wherein said processor is configured to
  obtain a 3D point cloud comprising a plurality of 3D points;
  display a 3D view window on said display that corresponds to a view of said 3D point cloud from a viewpoint, wherein said viewpoint is modifiable by a user;
  perform a projection of said 3D point cloud onto a 2D plane to form a projected 3D point cloud comprising a plurality of projected points, wherein each 3D point of said plurality of 3D points corresponds to a projected point of said plurality of projected points;
  display said projected 3D point cloud on a 2D view window on said display;
  accept a region drawn on said 2D view window by said user;
  accept a color selected by said user to apply to said region;
  modify said 2D view window to show said region in said color;
  update said 3D view window to
   when each 3D point of said plurality of 3D points has a corresponding projected point in said region, and when said each 3D point is visible from said viewpoint,
   display said each 3D point in said color,
   without updating said 3D point cloud to associate said color with said each 3D point.

2. The system of claim 1, wherein said projection of said 3D point cloud onto said 2D plane comprises an equirectangular projection.

3. The system of claim 1, wherein said projection of said 3D point cloud onto said 2D plane comprises a scaling transformation that matches a horizontal extent of said 3D point cloud to a horizontal width of said 2D view window, and that matches a vertical extent of said 3D point cloud to a vertical height of said 2D view window.

4. The system of claim 1, wherein said processor is further configured to
 apply a filter to said 2D view window to assign a pixel color to each pixel in said 2D view window in which there are no corresponding projected points;
 wherein said pixel color is based on colors of neighboring pixels containing projected points.

5. The system of claim 4, wherein said filter comprises an averaging convolutional filter.

6. The system of claim 1, wherein
 said processor comprises a CPU and a GPU;
 said CPU is configured to transmit said region and said color to said GPU; and
 said GPU is configured to generate said 3D view window;
 wherein said generate said 3D view window comprises when a pixel in said 3D view window corresponds to one or more 3D points with corresponding projected points in said region, set a pixel color of said pixel to said color.

7. The system of claim 1, wherein
said region is a polygon; and,
said processor is configured to determine when said projected point corresponding to said each 3D point is in said region with a point-inside-polygon test.

8. The system of claim 1, wherein said processor is further configured to
accept a blended color region drawn on said 2D view window by said user;
accept a plurality of colors selected by said user to apply to said blended color region;
modify said 2D view window to show each pixel of said blended color region in a blend of said plurality of colors;
update said 3D view window to
when each 3D point of said plurality of 3D points has a corresponding projected point in said region, and when said each 3D point is visible from said viewpoint,
display said each 3D point in said blend of said plurality of colors,
without updating said 3D point cloud to associate said blend of said plurality of colors with said each 3D point.

9. The system of claim 8, wherein
said blended color region comprises a triangle;
said plurality of colors comprises a vertex color for each vertex of said triangle; and,
said blend of said plurality of colors comprises a weighted combination of said vertex colors wherein weights of said weighted combination correspond to barycentric coordinates of said each pixel of said blended color region.

10. The system of claim 1, wherein said processor is further configured to
generate a texture image from said 2D view window, wherein an area of said texture image corresponding to said region in said 2D view window has said color;
wherein said update said 3D view window comprises
when a pixel in said 3D view window corresponds to one or more 3D points with corresponding projected points in said region, set a pixel color of said pixel based on said texture image and based on texture coordinates of said corresponding projected points.

11. The system of claim 10, wherein
said processor comprises a CPU and a GPU;
said region is a polygon;
said CPU is configured to triangulate said polygon into one or more triangles;
transmit vertices of said one or more triangles and said color to said GPU; and, said GPU is configured to
generate said area of said texture image based on said vertices and on said color.

12. A point cloud colorization system with real-time 3D visualization, comprising:
a processor comprising a CPU and a GPU;
a memory coupled to said processor; and,
a display coupled to said processor and to said memory;
wherein said processor is configured to
obtain a 3D point cloud comprising a plurality of 3D points;
display a 3D view window on said display that corresponds to a view of said 3D point cloud from a viewpoint, wherein said viewpoint is modifiable by a user;
perform an equirectangular projection of said 3D point cloud onto a 2D plane to form a projected 3D point cloud comprising a plurality of projected points, wherein each 3D point of said plurality of 3D points corresponds to a projected point of said plurality of projected points;
perform a scaling transformation of said 2D plane that matches a horizontal extent of said 3D point cloud to a horizontal width of a 2D view window, and that matches a vertical extent of said 3D point cloud to a vertical width of said 2D view window;
display said projected 3D point cloud on said 2D view window on said display;
accept a region drawn on said 2D view window by said user, wherein said region is a polygon;
accept a color selected by said user to apply to said region;
modify said 2D view window to show said region in said color;
apply a convolutional averaging filter to said 2D view window to assign a pixel color to each pixel in said 2D view window in which there are no corresponding projected points;
triangulate said polygon into one or more triangles;
transmit vertices of said one or more triangles and said color to said GPU;
generate an area of a texture image based on said vertices and on said color with said GPU;
update said 3D view window with said GPU to
when a pixel in said 3D view window corresponds to one or more 3D points with corresponding projected points in said region, set said pixel color of said pixel based on said texture image and based on texture coordinates of said corresponding projected points,
without updating said 3D point cloud to associate said color with said each 3D point.

* * * * *